Figure 3:
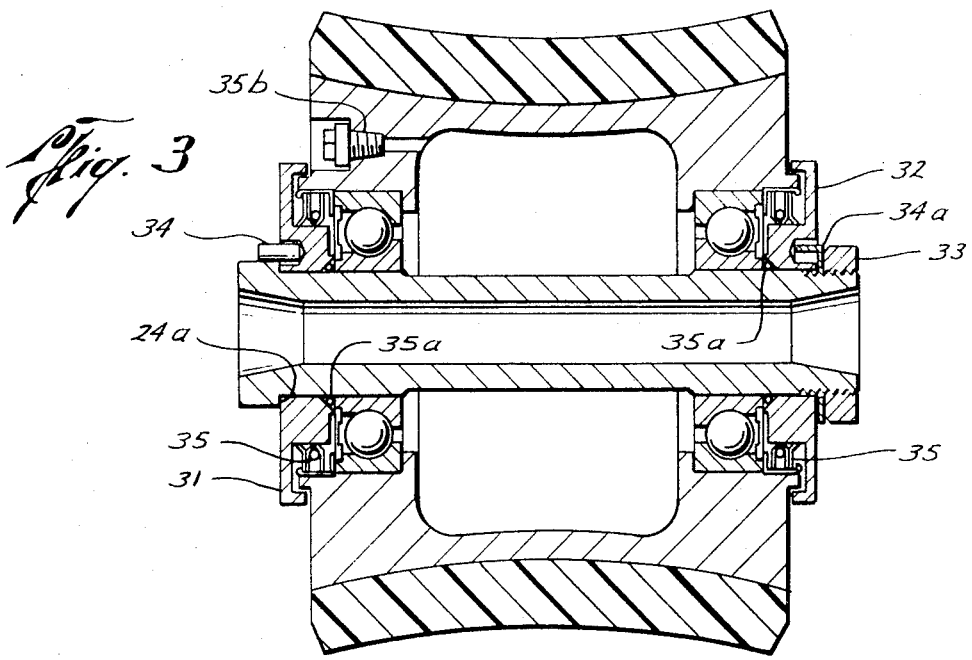

United States Patent [19]
Foster

[11] 3,744,837
[45] July 10, 1973

[54] PIPE SLING

[76] Inventor: Robert D. Foster, 773 Pifer, Houston, Tex. 77024

[22] Filed: Mar. 26, 1971

[21] Appl. No.: 128,589

Related U.S. Application Data

[63] Continuation of Ser. No. 804,948, March 6, 1969, abandoned.

[52] U.S. Cl................ 294/74, 214/1 PA, 193/35 R
[51] Int. Cl. ............................................. B66c 1/12
[58] Field of Search...................... 198/192, 192 A; 294/74; 193/35 R, 35 F; 214/1 PL, 1 PA

[56] References Cited
UNITED STATES PATENTS

| | | | |
|---|---|---|---|
| 2,948,384 | 8/1960 | Pate | 198/192 A |
| 2,966,255 | 12/1960 | Gleeson | 198/192 A |
| 2,910,835 | 11/1959 | Timothy | 193/35 R |
| 2,215,460 | 9/1940 | Childress | 193/35 R |
| 1,525,451 | 2/1925 | Kurtz | 214/1 PL X |
| 1,877,974 | 9/1932 | Robb | 214/1 PL |
| 2,603,523 | 7/1952 | Cameron | 294/74 |
| 2,723,121 | 11/1955 | Cartwright et al. | 294/74 |
| 3,078,977 | 2/1963 | Heinrich | 193/35 F |
| 3,080,034 | 3/1963 | Holmes | 214/1 PL |

Primary Examiner—Evon C. Blunk
Assistant Examiner—H. Lane
Attorney—J. Vincent Martin, Joe E. Edwards and Jack K. Springgate

[57] ABSTRACT

A load supporting sling or cradle including an elongated support element with a plurality of load-engaging members mounted on the support element in preselected positions and adapted to be in rolling engagement of the load.

3 Claims, 6 Drawing Figures

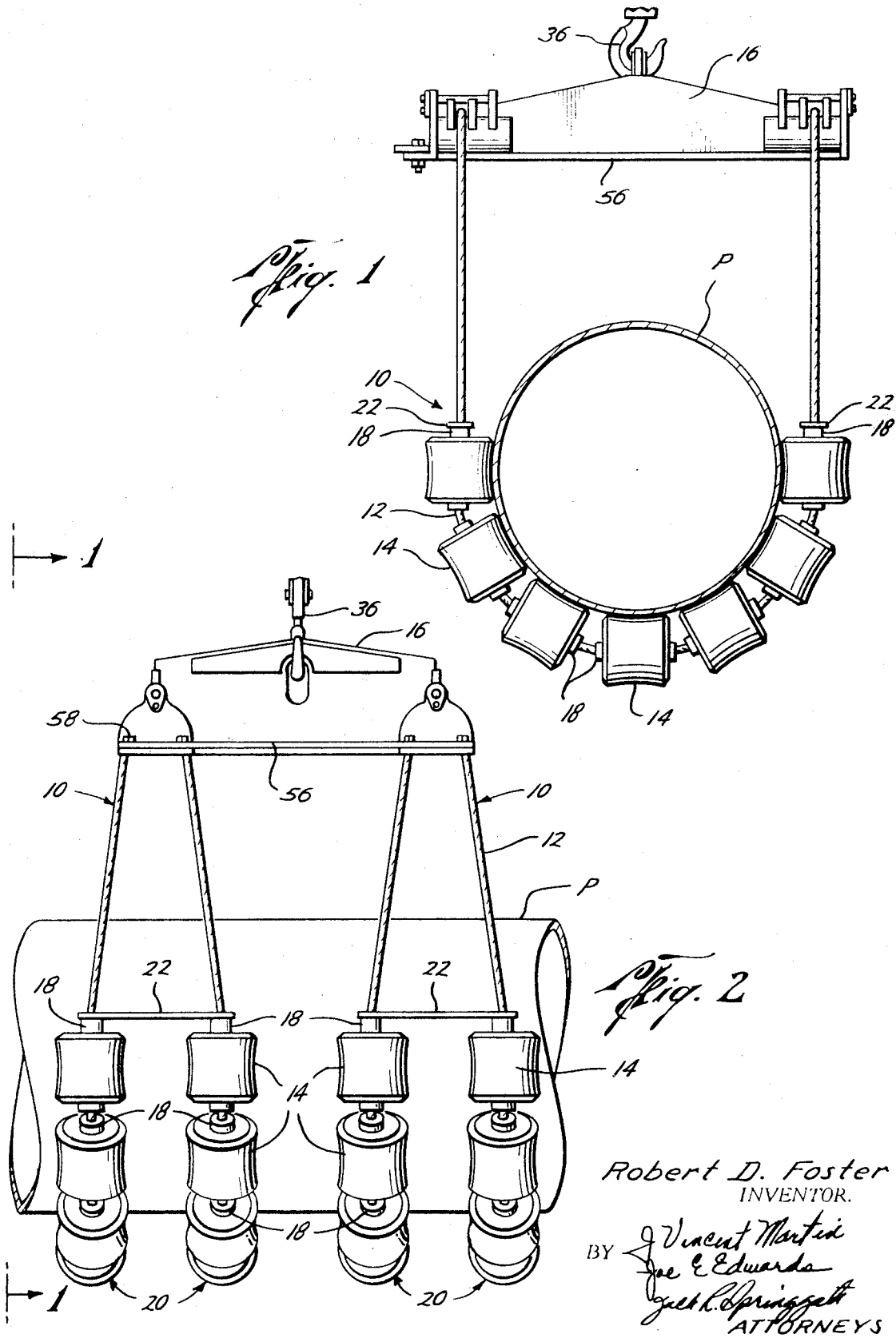

Robert D. Foster
INVENTOR.

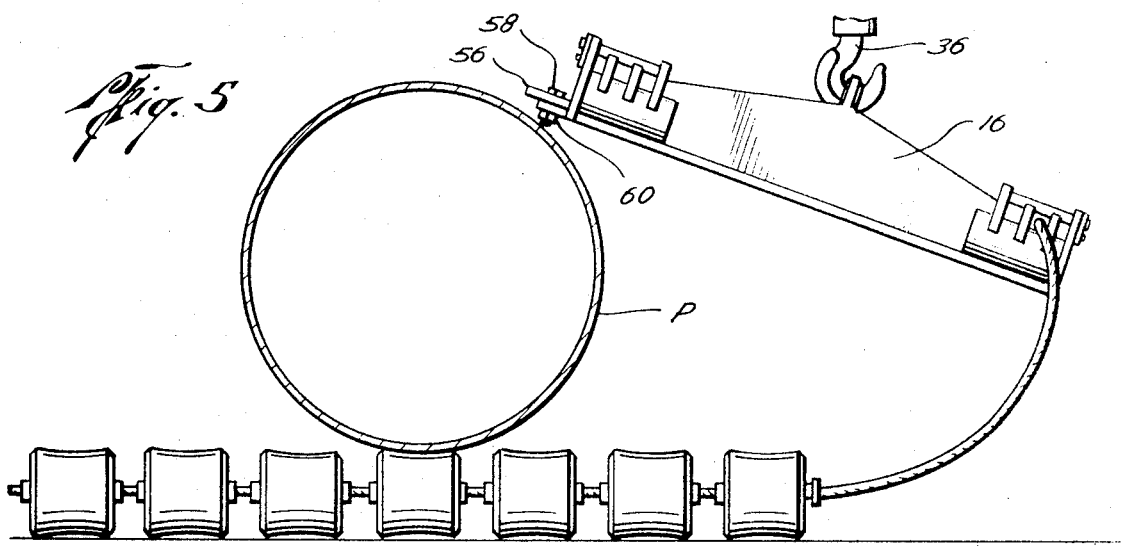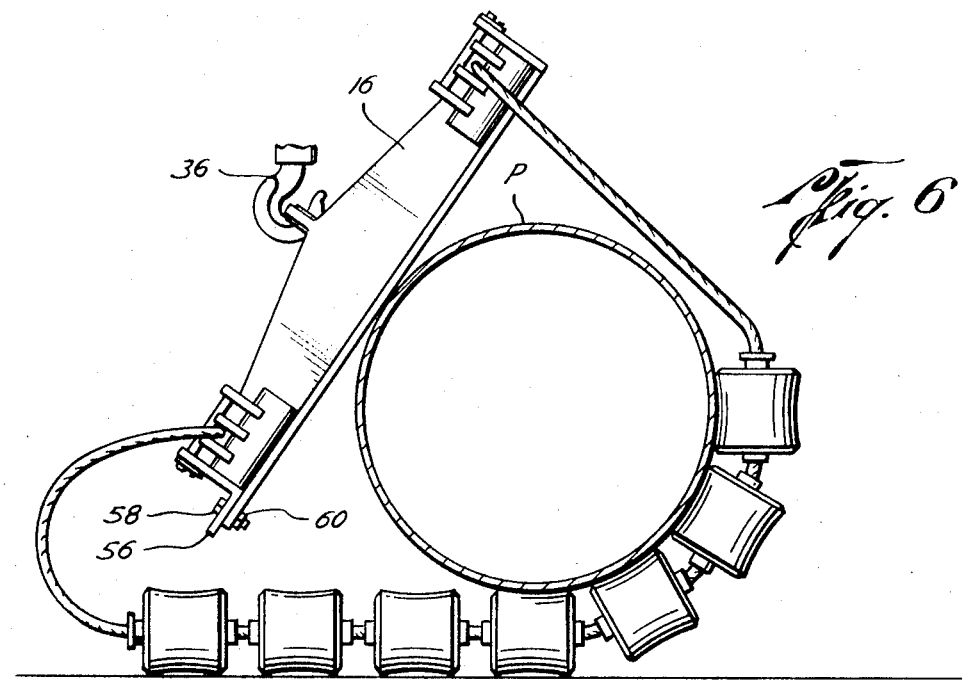

ns to the strongback 16. The strongback 16 provides a plurality of positions for the connection of each of the loops in the cable 14 to assure that the cable 14 when viewed as shown in FIG. 1 is positioned substantially vertically between the strongback 16 and the upper rollers 14 on opposite sides of pipe P. Thus, the improved sling 10 simulates a continuous roller engaging the lower half of the pipe P.

By mounting each of the rollers 14 in a preselected position on the cable 12, the forces exerted by the sling 10 are uniformly applied around the lower half of the pipe P toward the center of the pipe P. The forces involved in supporting the pipe P include both horizontal and vertical components exerted inwardly on the pipe P. To prevent a flattening or egging of the pipe P these forces should be directed toward the center of the pipe P. Each of the rollers 14 is mounted on the cable 12 in a preselected position and retained in such position by the cable clamps 18 engaging the cable 12 on both sides of each of the rollers 14. The spacing of the rollers 14 on the cable 12 determines the radial forces exerted on the pipe P. With the rollers 14 positioned close together, the radial forces exerted by each of the rollers 14 on the pipe P is less than the forces would be with greater spacing between the rollers 14.

Since the tension in the cable 12 is constant while a particular load is being supported, the load force exerted by a roller is determined by the tension in the cable and the angle at which the cable extends away from each side of the roller. For example, if the cable remains parallel to the axis of the roller at each side, no force will be exerted by the roller, and if the cable extends at substantially right angles, then the force exerted by the roller would be twice the cable tension. Forces exerted by the rollers 14 on the pipe P are controlled by the tension in the cable and the angle of the cable leaving each side of the roller. The angle of the cable is determined by the preselected spacing of the rollers on the cable and the tension on the cable is determined by the amount of weight supported by the cable and the manner in which the cable is suspended as hereinafter explained.

The structure shown in FIG. 2 includes two slings 10, with each of the slings 10 including two supporting lengths 20 under the pipe P. The spacer bars 22 connect between the cables 12 above the upper roller 14 on each side of the sling 10 so that the two lengths 20 remain parallel to each other in supporting pipe P and to protect the upper rollers 14 from the tractor boom when the pipe is too close to the boom.

The load engaging members or rollers 14 are adapted to roll as they are moved along the lower surface of pipe P. As best shown in FIG. 3, the rollers 14 have a central tubular mandrel 24 through which the cable 12 may extend and a rim 26 which is rotatively mounted on the mandrel 24 by the bearings 28. With other types of support element 12, the tubular member 24 may take a different form. For example, member 24 could be solid, provided with a hinge or socket at each end and thereby form a single link in a series of links forming an elongated flexible support element. The exterior surface of rim 26 is covered by the resilient material 30 to cushion the exterior portion of roller 14 which engages the exterior of pipe P. The material 30 is molded around the exterior of the rim 26 and may be any suitable resilient material such as a polyurethane. In some uses of the present invention the material 30 may be omitted. The end cover plates 31 and 32 are secured on mandrel 24 between shoulder 24a and nut 33. Means is provided to coact with the recesses in plates 31 and 32 to prevent their rotation such as the pin 34 and washer 34a. The bearings 28 support the rim 26 and the mandrel 24 and are protected by seal rings 35 and O-rings 35a to prevent entry of dirt and debris into the bearings. If desired, a lubricating fitting may be installed in the port 35b to inject lubricant into the rim recess to lubricate the bearings from within the rim 26.

Figure 4:
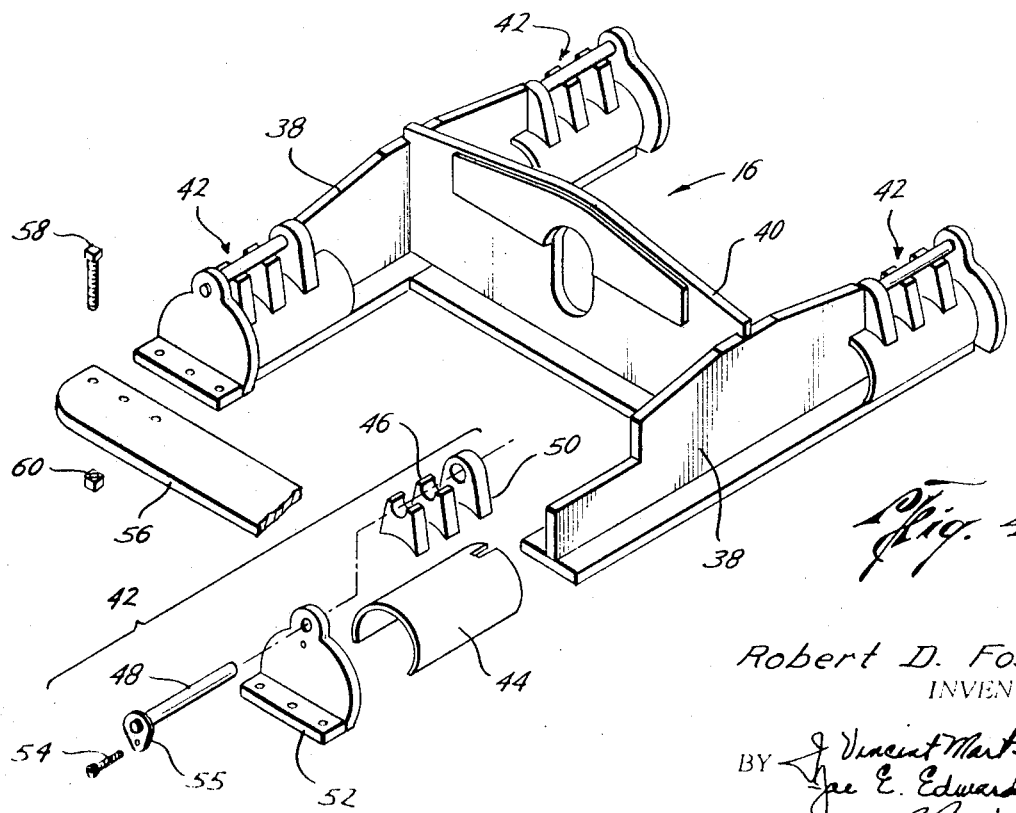

The details of strongback 16 are shown in FIG. 4. The function of the strongback 16 is to provide a connection for each loop end of the sling 10 to a lifting device such as the hook 36 which is shown in FIGS. 1, 2, 5 and 6. The strongback 16 includes the arms 38 which are joined by the cross member 40. Both ends of arms 38 are provided with an adjustable loop-receiving means 42 so that the loop ends of slings 10 may be positioned on the arms 38 to be generally vertically extending as shown in FIG. 1 when supporting the pipe P.

It is preferred that the cables 12 extend vertically upward into engagement with the strongback 16 so that the tension in the cable 12 is minimized. Connecting both ends of the cable to a hook above the center of the pipe P would increase the cable tension and therefore, the loading forces exerted by the rollers on the pipe P.

The adjustable loop-receiving means 42 includes the partial cylinder 44 which is suitably secured to the arm 38, the dividers 46, the removable pin 48 and the inner and outer pin supports 50 and 52. The pin 48 extends through outer support 52, rests upon the upper surfaces of dividers 46 and extends into inner support 50. Pin 48 is secured to outer support 52 by screw 54 which extends through head 55 on pin 48 into support 52.

To stiffen the structure of strongback 16, brace 56 is secured between two outer supports 52 on the ends of the arms 38 to one side of cross member 40. Bolts 58 and nuts 60 are provided to secure brace to supports 52. The member 40 is provided with the reinforced opening 62 to receive the hook 36. Brace 56 also functions to prevent the boom from being caught between the arms 38 if the boom is too close to the strongback 16.

The sling of the present invention is used by placing it under the pipe P as shown in FIG. 5 with the rollers 14 positioned so that the central one of the rollers is in its desired lifting position with respect to the pipe P. With the hook 36 supporting strongback 16, one end of strongback 16 is lowered into position to receive the loop ends of the sling 10. To connect the sling 10 to the strongback 16, the pins 48 of the loop-receiving means 42 are removed and then the loop ends are positioned in one of the spaces defined by the supports 50 and 52 and the dividers 46. With the loops positioned in the preselected spaces, the pins 48 are reinstalled in their position and secured by screws 54. In this position the pins 48 lock the loop ends of the sling 10 to the strongback 16.

The other ends of the slings 10 are secured to strongback 16 by first moving strongback over pipe P to the position shown in FIG. 6 and thereafter securing the loops to the loop-receiving means 42 of the other ends of the arms 38 as previously described. In this position both ends of the slings 10 are secured to the strongback 16 which is above the pipe P and the slings 10 extend under pipe P. Lifting strongback 16 brings the structure to a load supporting position shown in FIG. 1. In this load supporting position the slings uniformly support the pipe P without danger of flattening or otherwise damaging the pipe.

The improved load supporting structure of the present invention includes a plurality of load engaging members which are positioned with respect to the load so that all support forces are directed toward the center of the pipe. The load engaging members have a resilient material on their load engaging surface to assure that the surface of the load is not scratched, galled or otherwise damaged. This sling may be readily moved along a pipe which it is supporting. This sling also does not walk from under a pipe being supported.

The structure of the present invention essentially is a continuous roller support engaging the lower half of the pipe. Such structure uniformly distributes the supporting load to the pipe. The resilient exterior of the support rollers also prevents pressing in and cold working of the pipe welds as the sling is moved along a pipe. It has been found that the improved sling is easy to install and remove and further that it stores without kinking or tangling.

The foregoing disclosure and description of the invention are illustrative and explanatory thereof, and various changes in the size, shape and materials, as well as in the details of the illustrated construction, may be made within the scope of the appended claims without departing from the spirit of the invention.

I claim:

1. A pipe sling, comprising
a first continuous flexible connector,
a plurality of pipe supporting members mounted on said connector,
said members being rotatable about an axis parallel to said connector,
means for securing said members in preselected positions along said connectors,
the exterior of said members being resilient for engaging the exterior of pipe without damaging the pipe,
said connector including two supporting lengths on each of which a plurality of pipe supporting members are rotationally mounted,
a second flexible connector having two supporting lengths on each of which a plurality of pipe supporting members are rotationally mounted whereby the load supported by said sling is divided between the four supporting lengths of said connections, and
means for engaging the ends of said first and second flexible connectors whereby said supporting lengths all coact in the lifting of pipe when said engaging means is lifted.

2. A pipe sling according to claim 1 wherein said pipe supporting members are rollers and include,
a tubular mandrel,
a rim surrounding said mandrel, and
roller bearings rotatively mounting said rim on said mandrel.

3. A pipe sling according to claim 1 wherein, said pipe supporting members include a resilient outer surface for engaging pipes.

* * * * *